United States Patent [19]

Warren

[11] Patent Number: 4,853,265

[45] Date of Patent: Aug. 1, 1989

[54] EVA BASED MULTI-LAYER, HEAT-SHRINKABLE, PACKAGING FILM AND BAGS MADE THEREFROM

[75] Inventor: Thomas C. Warren, Greer, S.C.

[73] Assignee: W. R. Grace & Co.-Conn., Duncan, S.C.

[21] Appl. No.: 92,022

[22] Filed: Sep. 2, 1987

[51] Int. Cl.[4] .............................................. B32B 27/08
[52] U.S. Cl. ................................... 428/34.9; 428/35.2; 428/475.8; 428/516; 428/518; 428/520; 428/913; 428/212; 264/171
[58] Field of Search ................... 428/35, 516, 518, 520, 428/913, 34.9, 35.4, 35.2, 475.8, 212; 264/176.1, 171

[56] References Cited

U.S. PATENT DOCUMENTS

| | | | |
|---|---|---|---|
| 3,022,543 | 2/1962 | Baird, Jr. et al. | 428/36 |
| 3,555,604 | 1/1971 | Pahlke | 425/72.1 |
| 3,741,253 | 6/1973 | Brax et al. | 428/518 |
| 3,821,182 | 6/1974 | Baird, Jr. et al. | 264/171 |
| 4,048,428 | 4/1977 | Baird, Jr. et al. | 428/520 |
| 4,064,296 | 12/1977 | Bornstein et al. | 428/520 |
| 4,076,698 | 2/1978 | Anderson et al. | 526/348.6 |
| 4,188,443 | 2/1980 | Mueller et al. | 428/520 |
| 4,194,039 | 3/1980 | Mueller | 428/520 |
| 4,247,584 | 1/1981 | Widiger et al. | 428/520 |
| 4,274,900 | 6/1981 | Mueller et al. | 428/523 |
| 4,299,241 | 11/1981 | Seiller | 132/48 R |
| 4,352,844 | 10/1982 | Bornstein | 428/520 |
| 4,457,960 | 7/1984 | Newsome | 428/520 |
| 4,495,249 | 1/1985 | Ohya | 428/520 |
| 4,547,433 | 10/1985 | Ohya | 428/520 |
| 4,714,638 | 12/1987 | Lustig et al. | 428/520 |

FOREIGN PATENT DOCUMENTS 0120503  3/1984  European Pat. Off. .

OTHER PUBLICATIONS

Plastics Technology, Sep. 1984, p. 113.
Plastics Technology, Oct. 1984, pp. 13 and 15, Stamylex PE.

*Primary Examiner*—Ellis P. Robinson
*Assistant Examiner*—James J. Seidleck
*Attorney, Agent, or Firm*—John J. Toney; William D. Lee, Jr.; Jennifer L. Skord

[57] ABSTRACT

Disclosed is a heat-shrinkable, oriented, multi-layer packaging film. The film has at least two layers comprising EVA. One of the EVA layers is of EVA having a melt index different from the melt index of the EVA of the other layer or layers.

23 Claims, No Drawings

EVA BASED MULTI-LAYER, HEAT-SHRINKABLE, PACKAGING FILM AND BAGS MADE THEREFROM

The invention relates to thermoplastic, multi-layer, heat shrinkable (i.e. oriented), packaging films and bags or pouches made therefrom. In particular this invention relates to films and bags having improved orientation speed properties, while retaining excellent heat-shrinkability properties. Heat-shrinkable thermoplastic films are being used in packaging of non-food and food products like meat, cheese, poultry and the like. Many attempts have been made to make good shrink films at a faster speed; however, there is still room for improvement.

BACKGROUND OF THE INVENTION

Exemplary of patents showing use of EVA resins to produce films suitable for use in packaging are U.S. Pats. No. 3,741,253; 4,064,296; 4,457,960; 4,247,584; and 4,352,844.

A film known from U.S. Pat. No. 3,741,253 to Brax et al comprises a core layer of a vinylidene chloride copolymer (saran) between a layer of ethylene-vinyl acetate copolymer and layer of a cross-linked ethylene-vinyl acetate copolymer. Ethylene-vinyl acetate copolymer (EVA) has some improved properties over the previously used polyethylene. Vinylidene chloride copolymers are known barrier materials to fluids such as oxygen.

As disclosed in U.S. Pat. No. 4,064,296 to Bornstein et al the core layer may also be a hydrolyzed ethylene-vinyl acetate copolmyer (EVOH). It has similar oyxgen barrier properties as vinylidene chloride copolymers and offers the advantage that it may be irradiated without discoloration, which is further discussed below.

Blends of linear low density polyethylene and ethylene-vinyl acetate copolymer in oriented barrier films are disclosed in U.S. Pat. No. 4,457,960 to Newsome, which claims an oriented multiple layer polymeric film, comprising (a) a first barrier layer, said first layer having two opposing surfaces; (b) a second layer adhered to one said surface, said second layer being 10% to 90% linear low density polyethylene and 90% to 10% ethylene vinyl acetate; and (c) a third layer adhered to the other said surface, the composition of said third layer being selected from the group consisting of (i) ethylene-vinyl acetate, and (ii) blends of 10% to 90% linear low density polyethylene with 90% to 10% ethylene-vinyl acetate.

U.S. Pat. No. 4,247,584 to Widiger et al discloses a bag for packaging meat, comprising a laminated film fabricated into a bag by heat sealing together confronting portions of an outer layer, said film being a laminate comprised of: a molecularly oriented base layer of a vinylidene chloridevinyl chloride copolymer containing about 90 to 70 weight percent of a molecularly oriented outer layer of an EVA blend, said blend being comprised of about 10 to 90 weight percent of a low EVA random compolymer containing about 2 to 12 percent of vinyl acetate and having a melt index of about 0.2 to 10, and about 90 to 10 weight percent of a high EVA random copolymer containing about 8 to 30 percent of vinyl acetate and having a melt index of about 0.2 to 5, the percent of vinyl acetate in said low copolymer being below that in said high copolymer, and said blend having a weight average vinyl acetate content of about 4 to 15 percent. This patent states that the EVA blends utilized require a suitable amount of a relatively low VA copolymer to provide sufficient crystallinity for strength, and a suitable amount of the relatively high VA copolymer to afford desirable processing characteristics (flow, lubricity). Also is stated that the melt index of the blend must be sufficiently high for molecular orientation, and yet low enough to prevent excessive flow at elevated temperatures, which will cause shrink holes to be produced; the indices of the components should also be relatively close to one another to ensure compatibility, and good optical properties. Also is stated that the melting point of the blend can also be a significant factor, since too low a value will reduce toughness, and too high a value will make the orientation temperature more critical to satisfactory results; generally, the melting point of the blend should range from about 97° to 110° C.

U.S. Pat. No. 4,352,844 to Bornstein discloses a multilayer, heat-shrinkable packaging film having a first EVA surface sealing layer, a second EVA layer adjacent thereto, and a barrier layer adjacent the second EVA layer. The surface sealing layer comprises an EVA that has a higher melting temperature than the second EVA layer. Also, the second EVA layer is at least 1.5 times the thickness of the first EVA layer, and controls the shrink temperature of the entire multi-layer film. The film can be made into bags faster than prior art films can due to the surface EVA layer having less tackiness than the interior EVA layer.

It is an object of this invention to provide a packaging film and bags made therefrom having excellent or improved orientation characteristics over those of the materials used in the past. This means that the orientation speed during processing should be faster.

It is a further object of this invention to provide a process for manufacturing heat-shrinkable, multi-layer packaging film, wherein the orientation can be conducted at a much faster speed than was heretofore possible. Accordingly, the advantage of the invention is that factory production will increase without any concomitant increase in machinery and/or the labor force.

SUMMARY OF THE INVENTION

Therefore, the present invention provides a thermoplastic, multi-layer, heat-shrinkable packaging film comprising at least two layers of a co-polymer of ethylene and vinyl acetate wherein the melt index of the ethylene-vinyl acetate of one layer is different from the melt index of the ethylene-vinyl acetate of the other layer.

The invention also provides a thermoplastic, multi-layer, heat-shrinkable packaging film having improved orientability properties comprising first and second outer ethylene-vinyl acetate copolymer layers, and a core barrier layer between said outer layers, wherein the melt index of the ethylene-vinyl acetate of the first outer layer is different from the melt index of the ethylene-vinyl acetate of the second outer layer.

The invention also provides a process for manufacturing thermoplastic, multi-layer, heat-shrinkable packaging film comprising (I) extruding at least two layers of of ethylene-vinyl acetate copolymer wherein the ethylene-vinyl acetate copolymer of one layer has a certain melt index and the ethylene-vinyl acetate of the other layer has a melt index different therefrom, (II) orienting the extruded polymers in at least one direction, at a speed faster than the orienting speed of a comparable multi-layer film wherein the ethylene-vinyl acetate layers are of ethylene-vinyl acetate having substantially the same melt index, and (III) recovering a heat shrinkable polymeric film.

In another aspect the invention also provides side sealed and/or end sealed bags made from the above-mentioned inventive film.

DETAILED DESCRIPTION OF THE INVENTION

The term "ethylene vinyl acetate copolymer" (EVA) as used herein refers to a copolymer formed from ethylene and vinyl acetate monomers wherein the ethylene derived units in the copolymer are present in major amounts and the vinyl acetate (VA) derived units in the copolymer are present in minor amounts. For film forming purposes, it is desirable that the VA content of the EVA be from about 3% to about 25%. For VA contents above about 25%, the EVA is more of a glue. Many of the commercially available ethylene-vinyl acetate copolymers are suitable for use in the shrink films of the invention. The films of the invention have two or more EVA layers, and it does not matter if the melt index of an interior EVA layer is higher or lower than that of another interior layer or than that of a surface EVA layer. It is only required that the melt index of the EVA of one layer be different from the melt index of the EVA of the other layer(s). The difference preferably is more than about 0.3 dg/minute, more preferably more than about 0.4 dg/minute. It has been unexpectedly discovered that if in a multi-layer film comprising more than one layer of EVA, the MI of the EVA of at least one EVA layer is different from the MI of the EVA of the other layer(s), the film will orient faster than a comparable multi-layer film having more than one layer of EVA wherein each EVA layer has the same or substantially the same MI. If the film has three or more EVA layers, the film may have two or more EVA layers wherein in EVA has the same of substantially the same MI<but at least one EVA layer must have a MI different therefrom. Also the EVA may be blended with a different EVA for a layer as long as the resultant EVA blend has a resultant MI different from the MI of the other EVA layers; or if the resultant MI of the blend is substantially the same as that of another EVA layer, there still is at least one EVA layer having an EVA with a different MI.

Typically, in the manufacture of films, a suitable polymer usually in the form of pellets or the like, is brought into a heated area where the polymer feed is melted and heated to its extrusion temperature and extruded as a tubular "blown bubble" through an annular die. Other methods, such as "slot die" extrusion wherein the resultant extrudate is in planar, as opposed to tubular, form are also well known. If heat shrinkable film is desired, then after extrusion, the film is typically cooled and stretched, i.e. oriented by "tender framing" or by inflating with a "trapped bubble", to impart the heat-shrinkable property to the film, as is further described below. If desired, irradiation, typically via an electron beam, may take place after but preferably takes place prior to the stretching for orienting the film. However, for the present invention such irradiation is not necessary since a very suitable packaging film is obtained without irradiation. Below, first is described in detail the general process for making and orienting film. Then irradiation is described in detail.

More particularly, the manufacture of shrink, i.e. oriented, films, may be generally accomplished by extrusion (single layer films) or coextrusion (multi-layer films) of thermoplastic resinous materials which have been heated to or above their flow or melting point from an extrusion or coextrusion die in, for example, either tubular or planar (sheet) form, followed by a post extrusion cooling. The stretching for orienting the film may be conducted at some point during the cool down while the film is still hot and at a temperature within its orientation temperature range, followed by completing the cooling. Alternatively, after the post extrusion cooling, the relatively thick "tape" extrudate is then reheated to a temperature within its orientation temperature range and stretched to orient or align the cyrstallites and/or molecules of the material, and then cooled again. The orientation temperature range for a given material or materials will vary with the different resinous polymers and/or blends thereof which comprise the material. However, the orientation temperature range for a given thermoplastic material may generally be stated to be below the crystalline melting point of the material but above the second order transition temperature (sometimes referred to as the glass transition point) thereof. Within this temperature range, the material may be effectively stretched to provide a heat-shrinkable film.

The terms "orienting" or "oriented" are used herein to describe generally the process steps and resultant product charcteristics obtained by stretching, transversely, longitudinally, or both (whether during the post extrusion cool down or during reheating after the post extrusion cool down as described in the paragraph above) and substantially immediately cooling a resinous thermoplastic polymeric material which has been heated to a temperature within its orientation temperature range so as to revise the intermolecular configuration of the material by physical alignment of the crystallites and/or molecules of the material to improve certain mechanical properties of the film such as, for example, shrink tension and release stress. Both of these properties may be measured in accordance with ASTM D 2838-81. When the stretching force is applied in one direction, monoaxial orientating results. When the stretching force is applied in two directions, biaxial orientating results. The term "oriented" film is also herein used interchangeably with the term "heat-shrinkable" film with these terms designating a material which has been stretched and set by cooling while substantially retaining its stretched dimensions. An oriented (i.e. heat-shrinkable) material will tend to return to its original unstretched (unextended) dimensions when heated to an appropriate elevated temperature. However, by "orientability" or by "orientation processing characteristics or properties" as those terms are used herein, it is specifically intended to mean the orientation speed of the tape during processing in making the oriented film, i.e. how fast the tape moves in feet/minute. The reference is to the take up speed of the "S" shaped wrap. For instance, as can be seen in the Examples below for a 16 inch (40.6 cm) wide layflat tube, typically during make the films of the invention, the tape will move at 80 feet/minute, whereas during making comparative films, the tape will move at 50 to 60 feet/minute. Therefore, the films of the invention typically orient 30 to 60% faster than comparative films. Other widths of layflat tubing will process at different speeds, but the percentage of improvement will be comparable.

When it is intended to refer to the percent shrink of the resultant product film and bags made therefrom, then the term "heat-shrinakbility characteristics or properties" or the term "shrink characteristics or properties" is employed herein. An "oriented" or "heat-shrinkable" material is defined herein as a material which, when heated to an appropriate temperature above room temperature (for example 96° C.), will have a free shrink of about 5% or greater in at least one linear direction.

Returning to the basic process for manufacturing film as discussed above, it can be seen that the film, once extruded (or coextruded if it is a multi-layer film), is then oriented by stretching within its orientation temperature range. The stretching to orient may be accomplished in many ways such as, for example, by "trapped bubble" techniques or "tenter framing". These processes are well know to those in the art and refer to orienting procedures whereby the material is stretched in the cross or transverse direction (TD) and/or in the longitudinal or machine direction (MD). After being stretched, the film is quickly cooled while substantially retaining its stretched dimensions to cool the film rapidly and thus set or lock-in the oriented molecular configuration.

The films of the invention will orient at a speed in feet/minute at least 20% faster than comparable films having EVA of the same MI in each EVA layer, as is illustrated by comparison Example III below.

The film which has been made may then be stored in rolls and utilized to package a wide variety of items. If the material was manufactured by "trapped bubble" techniques the material may still be in tubular form or it may have been slit and opened up to form a sheet of film material. In this regard, a product to be packaged may first be enclosed in the material by heat sealing the film to itself where necessary and appropriate to form a pouch or bag and then inserting the product therein. Alternatively, a sheet of the material may be utilized to overwrap the product. These packaging methods are all well known to those of skill in the art.

When a material is of the heat-shrinkable (i.e. oriented) type, then after wrapping, the enclosed product may be subjected to elevated temperatures, for example, by passing the enclosed product through a hot air tunnel or by placing the enclosed product in hot water. This causes the enclosing heat shrinkable film to shrink around the product to produce a tight wrapping that closely conforms to the contour of the product. As stated above, the film sheet or tube may be formed into bags or pouches and thereafter utilized to package a product. In this case, if the film has been formed as a tube it may be preferable first to slit the tubular film to form a film sheet and thereafter form the sheet into bags or pouches. Such bags or pouches forming methods, likewise, are well known to those skill in the art.

The above general outline for manufacturing of films is not meant to be all inclusive since such processes are well known to those in the art. For example, see U.S. Pat. Nos. 4,274,900; 4,299,241; 4,194,039; 4,188,443; 4,048,428; 3,821,182; 355,604 and 3,022,543. The disclosures of these patents are generally representative of such processes and are hereby incorporated by reference.

Alternative methods of producing films of this type are known to those in the art. One well-known alternative is the method of forming a multilayer film by an extrusive coating in combination with an extrusion or coextrusion process as was discussed above. In extrusion coating a first tubular layer or layers is extruded and thereafter an additional layer or layers is simultaneously or sequentially coated onto the outer surface of the first tubular layer or a successive layer.

Many other process variations for forming films are well known to those in the art. For example, conventional thermoforming or laminating techniques may be employed. For instance, multiple substrate layers may be first coextruded via a blown bubble tube with additional layers thereafter being extrusion coated or laminated thereon, or two multi-layer tubes may be coextruded with one of the tubes thereafter being extrusion coated or laminated onto the other.

In the preferred embodiments as illustrated in the examples below, the multi-layer heat-shrinkable film of the invention contains a barrier layer. The layer is a barrier to fluids such as gas. The barrier layer may be composed of a layer comprising vinylidene chloride copolymer (commonly known as saran), or composed of a layer comprising hydrolyzed ethylene-vinyl acetate copolymer (EVOH), preferably hydrolyzed to at least about 50%, most preferably to greater than about 99%, or composed of both a layer comprising vinylidene chloride copolymer and a layer comprising EVOH. (EVOH is also known as ethylene-vinyl alcohol copolymer.) When the barrier layer is composed of a layer comprising EVOH, the mole percent of vinyl acetate prior to hydrolysis should be at least about 29%, since for lesser amounts the effectiveness of the hydrolyzed copolymer as a barrier to fluids such as gas is substantially diminished. It is further preferred that the barrier copolymer have a melt flow being being generally compatible with that of the other components of the multi-layer film, preferably in the range of about 3-10 (melt flow being determined generally in accordance with ASTM D1238). The gas of main concern is oxygen and transmission is considered to be sufficiently low, i.e. the barrier material is relatively gas impermeable, when the transmission rate is below 70 $cc/m^2/mil$ thickness hours/atms, as measured according to the procedures of ASTM Method D-1434. The barrier layer of the multi-layer barrier shrink film according to the barrier film embodiment of the present invention has a transmission rate below this value. EVOH can be advantageously utilized in the film of the invention since irradiative high energy electron treatment of the fully coextruded film does not degrade an EVOH barrier layer, as could be the case for a vinylidene chloride copolymer barrier layer. It is also well known that many nylons, i.e. polyamides, exhibit this transmission rate below 70 cc, and thus such nylon is also suitable as a barrier material.

When, as further discussed below, a vinylidene chloride copolymer (PVDC) is employed instead of or together with EVOH as the barrier layer, then the irradiation preferably should take place prior to application of the saran layer to avoid degradation thereof. This application may be achieved by well known extrusion coating methods, as discussed above. More particularly, the extrusion coating method of film formation is preferable to coextruding the entire film when it is desired to subject one or more layers of the film to a treatment which may be harmful to one or more of the other layers. Exemplary of such a situation is a case where it is desired to irradiate with high energy electrons one or more layers of a film containing a barrier layer comprised of one or more copolymers of vinylidene chloride (i.e. saran), such as of vinylidene chloride and acrylonitrile or such as of vinylidene chloride and vinyl chloride or such as of vinylidene chloride and methyl acrylate. In other words, the barrier layer includes a saran layer in addition to or instead of an EVOH layer. Those of skill in the art generally recognize that irradiation with high energy electrons is generally harmful to such saran barrier layer compositions, as irradiation may degrade and discolor saran, making it turn brownish. Thus, if full coextrusion and orientation followed by high energy electron irradiation of the multi-layer structure is carrier out on a film having a saran layer, the irradiation should be done at low levels with care. Alternatively, this situation may be avoided by using extrusion coating. Accordingly, by means of extrusion coating, one may first extrude or coextrude a first layer or layers, subject that layer or layers to high energy electron irradiation and thereafter extrusion coat the saran barrier layer and, for that matter, simultaneously or sequentially extrusion coat other later layers (which may or may not have been irradiated) onto the outer surface of the extruded previously irradiated tube and then orient the resultant. This sequence allows for the irradiative treatment of the first and later layer or layers without subjecting the saran barrier layer to the harmful discoloration effects thereof.

Irradiation may be accomplished by the use of high energy electrons, ultra violet radiation, X-rays, gamma rays, beta particles, etc. Preferably, electrons are employed up to about 20 megarads (MR) dosage level. The irradiation source can be any electron beam generator operating in a range of about 150 kilovolts to about 6 megavolts with a power output capable of supplying the desired dosage. The voltage can be adjusted to appropriate levels which may be for example 1,000,000 or 2,000,000 or 3,000,000 or 6,000,000 or higher or lower. Many apparatus for irradiating films are known to those of skill in the art. The irradiation is usually carried out at a dosage up to about 20 MR, typically between about 1 MR and about 20 MR, with a preferred dosage range of about 2 MR to about 12 MR. Irradiation can be carried out conveniently at room temperature, although higher and lower temperatures, for example, 0° C. to 60° C. may be employed.

In the Example below the multi-layer films were made by a conventional method of manufacturing, combining tubular coextrusion (colloquially called the hot blown bubble technique) with extrusion coating to achieve an oriented (heat-shrinkable) film. A tubular process was utilized wherein a coextruded tube of a multi-layer substrate core was extrusion coated with saran and another layer simultaneously, then the resultant structure was cooled and collapsed, and then reheated and biaxially stretched in the transverse direction and in the longitudinal machine direction via inflating the tube with a bubble. Then the stretched bubble was cooled and collapsed, and the deflated oriented film wound up as flattened, seamless, tubular film to be used layer to make bags, overwrap, et cetera. Prior to the coating of the saran layer and the additional layer, the substrate core was guided through an ionizing radiation field; for example, through the beam of an electron accelerator to receive a radiation dosage in the range of about 4 to 5 megarads (MR).

The EVA may be blended with one or more various other polymers, said one or more other polymers being present in a weight amount up to about 50%, more preferably less than about 35%, most preferably less than about 25%. These various other polymers also may be employed for the inner heat sealing layer of the preferred multi-layer barrier films of the present invention. Many of these other polymers are also suitable for use in any other layers of the films of the present invention, whether or not the films are barrier films. Suitable other polymers include, but are not limited to, LLDPE, LDPE, HDPE, MDPE, polypropylene, ethylene/propylene copolymers, ethylene/ alkyl-acrylate copolymers (EAA) [such as ethylene/methyl-acrylate (EMA), ethylene/ethyl-acrylate (EEA), and ethylene/butyl-acrylate (EBA)], acid modified EVA, copolymers of (i) and (ii) where (i) is an alpha-olefin of the formula $RHC=CH_2$ wherein R is H or $C_1$ to $C_8$ alkyl and (ii) is an alpha, beta-ethylenically unsaturated carboxylic acid, and the like and mixtures thereof. Preferably, in the $RHC=CH_2$ copolymer of an olefin and a carboxylic acid, the olefin is ethylene and the carboxylic acid is acrylic acid or methacrylic acid. Materials, which are the copolymer of an alpha-olefin having the formula $RHC=CH_2$ wherein R is H or $C_1$ to $C_8$ alkyl and an alpha, beta-ethylenically unsaturated carboxylic acid, representatively may be one of the Primacor (TM) polymers, supplied by Dow Chemical Company, Midland, Michigan. Primacor is produced by the free radical copolymerization of ethylene and a carboxylic acid comonomer therefor such as acrylic acid or methacrylic acid. Also, the copolymer of an alpha-olefin having the formula $RHC=CH_2$ wherein R is H or $C_1$ to $C_8$ alkyl and an alpha, beta-ethylenically unsaturated carboxylic acid may be metal salt neutralized such as with sodium, Na. Thus, the copolymer may be an ionomer. Representatively, such an ionomeric material is commercially available as Surlyn (TM)from the E. I. du Pont de Nemours Company of Wilmington, Delaware, and is described in detail in U.S. Pat. No. 3,355,319 and U.S. Pat. No. 3,845,163.

DEFINITIONS

The term "saran" or "PVDC", as used herein, refers to a vinylidene chloride copolymer wherein a major amount of the copolymer comprises vinylidene chloride and a minor amount of the copolymer comprises one or more unsaturated monomers copolymerizable therewith. Examples of unsaturated monomers copolymerizable with the vinylidene chloride are vinyl chloride, acrylonitrile, and alkyl acrylates having 1 to 18 carbon atoms in the alkyl group.

As used herein the term "extrusion" or the term "extruding" is intended to include coextrusion, extrusion coating, or combinations thereof, whether by tubular methods, planar methods, or combinations thereof.

Unless specifically set forth and defined or otherwise limited, the terms "polymer" or "polymer resin" as used herein generally include, but are not limited to, homopolymers, copolymers, such as, for example block, graft, random and alternating copolymners, terpolymers, etc. and blends and modifications thereof. Furthermore, unless otherwise specifically limited the term "polymer" or "polymer resin" shall include all possible molecular configurations of the material. These structures include, but are not limited to, isotactic, syndiotactic and random molecular configurations.

The term "polyethylene", as used herein, refers to families of resins obtained by substantially polymerizing the gas ethylene, $C_2H_4$. By varying the comonomers, catalysts and methods of polymerization, properties such as density, melt index, crystallinity, degree of branching, molecular weight and molecular weight distribution can be regulated over wide ranges. Further modifications are obtained by other processes, such as halogenation, and compounding additives. Low molecular weight polymers of ethylene are fluids used as lubricants; medium weight polymers are waxes miscible with paraffin; and the high molecular weight polymers are resins generally used in the plastics industry. Polyethylenes having densities ranging from about 0.900 g/cc to about 0.935 g/cc are called low density polyethylenes (LDPE) while those having densities from about 0.935 g/cc to about 0.940 g/cc are called medium density polyethylenes (MDPE), and those having densities from about 0.941 g/cc to about 0.965 g/cc and over are called high density polyethylenes (HDPE). The older, classic low density types of polyethylenes are usually polymerized at high pressures and temperatures whereas the older, classic high density types are usually polymerized at relatively low temperatures and pressures.

The so called linear low density polyethylenes are copolymers of ethylene and varying amounts of higher alpha-olefins with e.g. 5 to 10 carbon atoms per molecule (U.S. Pat. No. 4,076,698) or 3 to 8 carbon atoms per moleculre (Published European Patent Application 120503 published Oct. 3, 1984, assigned to Union Carbide), for example copolymers of ethylene and butene-1, copolymers of ethylene and octene-1, and the like. Depending on their density these materials are referred to as linear low density polyethylene (LLDPE) or very low density linear polyethyelene (VLDPE), the separation line being at a density of about 0.910 g/cc. Some properties of VLDPE have been described in Pastics Technology, September 1984, page 113. In October 1984, on page 13 of Plastics Technology, was another article describing VLDPE entitled "New Kind of Polyethylene Combines Flexibility, Toughness, heat Resistance". The article lists a number of the properties of VLDPE and compares them with EVA. VLDPE is also described in a company brochure published in February 1984 by DSM in the Netherlands and entitled "Stamylex PE". Their properties are said to be a unique combination between those of standard polyethylene and polyolefinic rubbers. Their sealability and their compatibility with other polymers has been mentioned. Accordingly, the term "linear low density polyethylene" (LLDPE), as used herein, refers to the never copolymers of major amount of ethylene with a minor amount of one or more comonomers selected from $C_3$ to about $C_{10}$ or higher alpha-olefins such as butene-1, pentene-1, hexene-1, octene-1, etc. in which the molecules thereof comprise long chains with few side chains or branched structures achieved by low pressure polymerization. The side branching which is present will be short as compared to non-linear polyethylenes. The molecular chains of a linear polymer may be intertwined, but the forces tending to hold the molecules together are physical rather than chemical and thus may be weakened by energy applied in the form of heat. Linear low density polyethylene has a density preferably in the range from about 0.911 g/cc to about 0.935 g/cc, more preferably in the range of from about 0.912 g/cc to about 0.928 g/cc for film making purposes. The melt flow index of linear low density polyethylene generally ranges from between about 0.1 to about 10 grams per ten minutes and preferably between from about 0.5 to about 3.0 grams per ten minutes. LLDPE resins of this type are commercially available and are manufactured in low pressure vapor phase and liquid phase processes using transition metal catalysts. The very low density linear low density polyethylenes (VLDPE) have a density from about 0.910 g/cc to about 0.860 g/cc, or even lower.

The term "ethylene/alkyl-acrylate copolymer" (EAA) as used herein refers to a copolymer formed from ethylene and alkyl-acrylate wherein the alkyl moiety has 1 to 8 carbon atoms and the ethylene derived units in the copolymer are present in major amounts and the alkyl-acrylate derived units in the copolymer are present in minor amounts. Thus, the term "ethylene/methyl acrylate copolymer" (EMA) refers to a copolymer formed from ethylene and methyl acrylate monomers. The term "ethylene/ethyl acrylate copolymer" (EEA) refers to a copolymer formed from ethylene and ethyl acrylate monomers. The term "ethylene/butyl acrylate copolymer" (EBA) refers to a copolymer formed from ethylene and butyl acrylate monomers. Many suitable EBA's are commercially available and these have a butyl acrylate content from about 3% up to about 18% by weight. USI is a commercial supplier of Resin No. 4895, which is an EBA having about 3% by weight butyl acrylate and a melt index of 3 and a melting point of about 106° to 107° C.

MATERIALS EMPLOYED IN THE LABORATORY EXAMPLES

The saran employed in some of the laboratory examples was Ixan (TM) WV 320 supplied by Solvay Corporation. It is a copolymer of vinylidene chloride with vinyl chloride. Another saran (denoted in the examples below as Saran-MA) employed in some of the laboratory examples was XU32027.01, supplied by Dow Chemical. It is a copolymer of vinylidene chloride with methylacrylate.

Some of the EVA employed in the laboratory Examples was UE 80306; it has 9% VA; MI=2.2. Some of the EVA employed in the laboratory examples was NA 295-00, which is an EVA containing 6% vinyl acetate and having a melt index of 2.6. Both were supplied by USI.

Some of the EVA employed in the laboratory examples was LD318.92, which is an EVA containing 9% vinyl acetate and having a melt index of 2.0. Some of the EVA was EX363BA which has 9% VA. The MI was 2.8. The EVA employed in some of the laboratory examples was LD722.62, which is an EVA containing 20% vinyl acetate and having a melt index of 3.0. The EVA employed in some of the laboratory examples was LD720.62, which is an EVA containing 18% vinyl acetate and having a melt index of 1.5. All were supplied by Exxon.

Some of the EVA was 3375, supplied by Norchem (now owned by USI). It has 13% VA and its MI=0.25.

The EVA employed in some of the laboratory examples was Elvax 3128 which is an EVA containing 9% vinyl acetate and having a melt index of 2. Also employed was Elvax 3165, which is an EVA having 18% VA, and its MI=0.7 Some of the EVA employed in the examples was PE3508, which is an EVA having 12% VA and having a melt index of 0.35, and some was PE 3507-1, which has 6% VA and a melt index of 2.7. The EVA employed in some of the laboratory examples was Elvax 3135X which is an EVA containing 12% vinyl acetate and having a melt index of 0.35, and it has a density of 0.940. Some of EVA employed in the laboratory Examples was PE-3432, which has 20% VA; and its MI=2.8. All were supplied by Du Pont.

The LLDPE employed in the examples was Dowlex 2045.03 having melt index of 1.1 and a density of 0.920. It ws supplied by Dow Chemical. The comonomer is octene.

The HDPE employed in the Examples was Alathon 7850, having melt index of 18 and a density of 0.960. It was supplied by Du Pont.

The following Examples are intended to illustrate the preferred embodiments of the invention and comparsions thereto. It is not intended to limit the invention thereby.

EXAMPLES film. Where irradiation has been indicated in the samples, the two-layer substrate was irradiated at the MR noted prior to the coating on of saran and the outer layer. Orientation speed and % shrink, were measured for the films as noted in the Tables below. Percentages indicated in the Examples were calculated as % by weight. Melt index, indicated as MI, was calculated in dg/minute. It was measured in accordance with ASTM D1238, condition 190/2.16. For each EVA layer, the EVA polymer employed and its MI are indicated in the tables. After orientation, the total thickness of the 4-layer film was about 2.2 to about 2.5 mils. In all samples, films were made of the following 4-layer structure:

|  | SUBSTRATE LAYERS | | EXTRUSION COATED LAYERS | |
|---|---|---|---|---|
|  | SEALING LAYER 1 | LAYER 2 | BARRIER LAYER 3 | OUTSIDE LAYER 4 |
| Polymer: | EVA | EVA | SARAN | EVA |
| Before Orientation Thickness (mils): | 3 | 14.5 | 3.5 | 6.5 |

The films were made by first hot blowing through an annular die a two-layer extruded tube of the structure: LAYER 1/LAYER 2 as the substrate. Then with a two-ply die, a layer of saran (barrier layer 3) and another layer (outside layer 40 were extrusion coated on.

EXAMPLE I A

Two 4-layer heat-shrinkable films were made as described above and the orientation speed measured. Results are summarized in Table below.

TABLE I

| SAMPLE NUMBER AND IRRAD OF LAYERS 1 AND 2 (MR) | LAYER 1 | LAYER 2 | BARRIER LAYER 3 | LAYER 4 | ORIENTATION SPEED FT/MIN (M/MIN) |
|---|---|---|---|---|---|
| 1 (4MR) | EVA (9% VA) [LD318.92] MI = 2.0 | EVA (12% VA) [Elvax 3135x] MI = 0.35 | SARAN | EVA (9% VA) [LD318.92] MI = 2.0 | 80 (24.4) |
| 2 (6MR) | EVA (9% VA) [LD318.92] MI = 2.0 | EVA (12% VA) [Elvax 3135x] MI = 0.35 | SARAN | EVA (9% VA) [LD318.92] MI = 2.0 | 80.0 (24.4) |

The resultant 4-layer structure was then cooled and collapsed. The tube was then reheated and oriented by stretching via a trapped bubble 4:1 in the transverse direction and 3:1 in the longitudinal direction for an overall biaxial orientation of 12:1. When such films were made into bags, the het sealing layer 1 was the "inner" or "inside" layer as it was the bag "inside" and "outside" layer 4 was the bag "outside". Layer 2 and barrier layer 3 were "interior" layers of the multi-layer As can be seen from Table I, film Samples 1 and 2, wherein EVA layers 1 and 4 had the same MI but EVA layer 2 had an MI different by 1.65 dgg/minute, exhibited an excellent orientation speed of 80 feet/minute (24.4 meters/minute).

Films were made as in Example I except saran-MA was employed for barrier layer 3, and the EVA polymers were varied in each of layers 1, 2, and 4. The following films were made:

TABLE II-A

| SAMPLE NUMBER AND IRRAD OF LAYERS 1 AND 2 (MR) | SUBSTRATE | | EXTRUSION COATED LAYERS | |
|---|---|---|---|---|
|  | SEALING LAYER 1 | LAYER 2 | BARRIER LAYER 3 | OUTSIDE LAYER 4 |
| 1 (4.5MR) | EVA (6% VA) [NA295-00] MI = 2.6 | 60% EVA (20%VA) [PE-3432] MI = 2.8; 40% EVA (9% VA) [LD318.92] MI = 2.0; AVER MI = 2.48 | SARAN-MA | 93% EVA (9% VA) [LD318.92] MI = 2.0; 7% LLDPE (0.920) [DOWLEX 2045.03] |
| 2 (4.5MR) | EVA (6% VA) [PE3507-1] MI = 2.7 | 60% EVA (20% VA) [PE-3432] MI = 2.8; | SARAN-MA | 91% EVA (9% VA) [LD318.92] MI = 2.0; |

TABLE II-A-continued

| SAMPLE NUMBER AND IRRAD OF LAYERS 1 AND 2 (MR) | SUBSTRATE | | EXTRUSION COATED LAYERS | |
|---|---|---|---|---|
| | SEALING LAYER 1 | LAYER 2 | BARRIER LAYER 3 | OUTSIDE LAYER 4 |
| | | 40% EVA (9% VA) [LD318.92] MI = 2.0; AVER MI = 2.48 | | 9% LLDPE (0.920) [Dowlex 2045.03] |
| 3 (4.5MR) | EVA (6% VA) [PE3507-1] MI = 2.7 | EVA (18% VA) [LD720.62] MI = 1.5 | SARAN-MA | 84% EVA (9% VA) [EX363BA] MI = 2.8; 16% HDPE [7850] |
| 4 (4.5MR) | EVA (6% VA) [NA295-00] MI = 2.6 | EVA (18% VA) [LD720.62] MI = 1.5 | SARAN-MA | 84% EVA (9% VA) [LD318.92] MI = 2.0; 16% HDPE [Alathon 7850] |
| 5 (4.5MR) | EVA (6% VA) [NA295-00] MI = 2.6 | EVA (18% VA) [LD720.62] MI = 1.5 | SARAN-MA | 93% EVA (9% VA) [LD318.92] MI = 2.0; 7% LLDPE (0.920) [Dowlex 2045.03] |

TABLE II-B

| SAMPLE NUMBER | ORIENTATION SPEED FT/MIN (M/MIN) | % SHRINK 185° F. (85° C.) | |
|---|---|---|---|
| | | TRANS-VERSE | LONGI-TUDINAL |
| 1 | 80 (24.4) | 43 | 30 |
| 2 | 80 (24.4) | 41 | 28 |
| 3 | 80 (24.4) | 42 | 35 |
| 4 | 80 (24.4) | 40 | 31 |
| 5 | Not measured | 45 | 30 |

As can be seen from samples 1 and 2, it was possible to blend two different EVA's with different melt indices in one layer, i.e. layer 2. The resultant MI of about 2.5 for layer 2, for both of Samples 1 and 2, was approaching the MI of 2.6 for layer 1 of Sample 1 and the MI of 2.7. for layer 1 of Sample 2. Thus, layers 1 and 2 of Samples 1 and 2 essentially the same MI of about 2.5 to 2.7 dg/minute. However, for both of Samples 1 and 2, the MI of the EVA of layer 4 was 20.0, and thus different about 0.5 dg minute from the MI's of layers 1 and 2, which ranged from about 2.5 to 2.7, and thus improved orientation speeds of 80 feet/minute were obtained.

It is also noted from all of Samples 1-5, the EVA may be blended with various other polymers, as herein the EVA of layer 4 was blended with LLDPE or HDPE.

COMPARISON EXAMPLE III

For comparison with Samples 1 and 2 above, additional comparison films were made with barrier layer 3 being Saran W320 except this time for each sample, the polymer of layers 1, 2 and 4 was the same EVA. The following films were made and the results summarized in Comparison Table III below:

COMPARISON TABLE III

| SAMPLE NUMBER IRRAD OF LAYERS 1 AND 2 | LAYERS 1, 2, AND 4 | MI of the EVA of Layers 1, 2, and 4 (dg/min) | ORIENTATION SPEED FT/MIN (M/MIN) | % SHRINK 185° F. (85° C.) | |
|---|---|---|---|---|---|
| | | | | TRANS-VERSE | LONGI-TUDINAL |
| 1 (4.5MR) | EVA (9% VA) [Elvax 3128] | 2.0 | 60 (18.3) | 43 | 26 |
| 2 (4.5MR) | EVA (9% VA) [LD318.92] | 2.0 | 57 (17.4) | 44 | 27 |
| 3 (4.5MR) | EVA (9% VA) [USI UE-80306] | 2.2 | 49 (14.9) | 43 | 26 |
| 4 (4.5MR) | EVA (9% VA) [EX363BA] | 2.9 | 57 (17.4) | 48 | 31 |
| 5 (4.5MR) | EVA (12% VA) [Elvax 3135x] | 0.35 | 55 (16.8) | 48 | 30 |
| 6 (4.5MR) | EVA (12% VA) [PE3508] | 0.35 | 57 (17.4) | 48 | 30 |
| 7 (4.5MR) | EVA (13% VA) [3375] | 0.25 | 56 (17.1) | 49 | 29 |

As can be seen from Table III, the orientation speed of each film ranged from only 49 feet/minute to only 60 feet/minute (14.9 meters/minute to 18.3 meters/minute). It is noted that although some of these films consisted of low MI EVA namely films 5,6,and 7, they did not orient any faster than the films that consisted of high MI EVA, namely films 1, 2, 3, and 4. It is reiterated, that for each film, the EVA of layers 1, 2, and 4 was the same EVA with the same MI.

Also, it can be seen that the samples of Table II, retained a % shrink comparable to that of the comparison samples in Table III, yet oriented 25% or more faster than the comparison samples.

What is claimed is:

1. A thermoplastic, multi-layer, heat-shrinkable packaging film, having improved orientation characteristics comprising at least two layers of a copolymer of ethylene and vinyl acetate wherein the melt index of the ethylene-vinyl acetate of one layer is different from the melt index of the ethylene-vinyl acetate of the other layer about 0.3 dg/minute or more.

2. The film of claim 1, wherein at least one ethylene-vinyl acetate layer is ethylene-vinyl acetate in blend with up to 50% by weight based on the layer composition of an other polymer.

3. The film of claim 2, wherein said other polymer is selected from ethylene/alkyl-acrylate copolymer, linear low density polyethylene (LLDPE), high density polyethylene (HDPE), linear medium density polyethylene (LMDPE), linear high density polyethylene (LHDPE), low density polyethylene (LDPE), medium density polyethylene (MDPE), another ethylene/vinyl acetate (EVA), acid-modified EVA, polypropylene, ethylene/propylene copolymers, copolymers of an alpha-olefin having the formula $RHC=CH_2$ wherein R is H or $C_1$ to $C_8$ alkyl and an alpha,beta-ethylenically unsaturated carboxylic acid, and mixtures thereof.

4. The film of claim 1, further including a barrier layer.

5. The film of claim 1, wherein said film has three or more layers of copolymer of ethylene-vinyl acetate and the layer of copolymer of ethylene-vinyl acetate with the different melt index is an interior layer.

6. The film of claim 1, wherein at least one layer of ethylene-vinyl acetate copolymer has been irradiated at a dosage up to about 20 MR.

7. The film of claim 1, further including a barrier layer comprising a copolymer of vinylidene chloride and methyl acrylate.

8. A bag formed from the film of claim 1, said bag having end seal(s), side seal(s), or a combination thereof.

9. The bag of claim 8, further including a barrier layer.

10. The bag of claim 8, wherein at least one layer of copolymer of ethylene-vinyl acetate is an interior layer.

11. The bag of claim 8, further including a barrier layer comprising a copolymer of vinylidene chloride and methyl acrylate.

12. A process for improving orientation speed when manufacturing thermoplastic, multi-layer, heatshrinkable packaging film comprising (I) extruding at least two layers of ethylene-vinyl acetate copolymer wherein the ethylene-vinyl acetate copolymer of one layer has a certain melt index and the ethylene-vinyl acetate of the other layer has a melt index different therefrom, about 0.3 dg/minute or more (II) orienting the extruded polymers in at least one direction, at a speed faster than the orienting speed of a comparable multi-layer film wherein the ethylene-vinyl acetate layers are of ethylene-vinyl acetate having substantially the same melt index, and (III) recovering a heat-shrinkable polymeric film.

13. The process of claim 12, wherein the orienting speed is about 20% or more faster than that of the comparable multi-layer film.

14. The process of claim 12, further including extruding a barrier layer prior to the orienting step.

15. The process of claim as, wherein at least one ethylene-vinyl acetate layer is ethylene-vinyl acetate in blend with another polymer, in an amount up to 50% by weight based on the layer composition.

16. The process of claim 12, further including irradiating at least one layer of ethylene-vinyl acetate copolymer at a dosage up to about 20 MR prior to the orienting step.

17. The process of claim 12, further including extruding a barrier layer prior to the orienting step, wherein said barrier layer comprises a copolymer of vinylidene chloride and methyl acrylate.

18. A thermoplastic, multi-layer, heat-shrinkable packaging film, having improved orientation characteristics comprising first and second outer ethylene-vinyl acetate copolymer layers, and a core barrier layer between said outer layers, wherein the melt index of the ethylene-vinyl acetate of the first outer layer is different from the melt index of the ethylene-vinyl acetate of the second outer layer, about 0.3 dg/minute or more said film having been oriented at speed about 20% faster than the orienting speed of a comparable multi-layer film wherein the ethylene-vinyl acetate layers are of ethylene-vinyl acetate having substantially the same melt index.

19. The film of claim 18, wherein said barrier layer is one or more layers of ethylene-vinyl alcohol copolymer, vinyidene chloride copolymer, or nylon.

20. The film of claim 18, wherein said interior layer has been irradiated at a dosage up to about 20 MR.

21. The film of claim 18, wherein said barrier layer comprises a copolymer of vinylidene chloride and methyl acrylate.

22. A thermoplastic, multi-layer, heatshrinkable packaging film having improved orientation characteristics comprising at least two layers of copolymer of ethylene-vinyl acetate wherein the melt index of the ethylene-vinyl acetate of one layer is different from the melt index of the ethylene-vinyl acetate of the other layer by about 0.3 dg/minute or more, said film having been oriented at a speed about 20% or more faster than that of a comparable multi-layer film wherein the ethylene-vinyl acetate layers are of ethylene-vinyl acetate having substantially the same melt index.

23. The film of claim 22, further including a barrier layer comprising a copolymer of vinylidene chloride and methyl acrylate.

* * * * *